United States Patent
Chandrasekaran et al.

(10) Patent No.: US 10,098,007 B2
(45) Date of Patent: Oct. 9, 2018

(54) COVERAGE MANAGEMENT FOR WIRELESS COMMUNICATION NETWORK

(71) Applicant: T-Mobile USA, Inc., Bellevue, WA (US)

(72) Inventors: Nirmal Chandrasekaran, West New York, NJ (US); Brian C. Liu, Parsippany, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/237,454

(22) Filed: Aug. 15, 2016

(65) Prior Publication Data

US 2018/0049039 A1    Feb. 15, 2018

(51) Int. Cl.
  *H04W 16/18*    (2009.01)
  *H04W 4/021*    (2018.01)
  *H04W 4/02*    (2018.01)

(52) U.S. Cl.
  CPC ........... *H04W 16/18* (2013.01); *H04W 4/021* (2013.01); *H04W 4/023* (2013.01)

(58) Field of Classification Search
  CPC ..... H04W 16/02; H04W 16/18; H04W 16/24; H04W 24/00; H04W 24/02
  See application file for complete search history.

(56) References Cited

U.S. PATENT DOCUMENTS

| | | | | |
|---|---|---|---|---|
| 6,141,565 | A * | 10/2000 | Feuerstein | H04W 16/06 455/422.1 |
| 9,578,530 | B2 * | 2/2017 | Gopalakrishnan | H04W 24/02 |
| 9,706,411 | B2 * | 7/2017 | Goswami | H04W 16/04 |
| 2011/0009105 | A1 * | 1/2011 | Lee | H01Q 9/0407 455/418 |
| 2012/0155428 | A1 * | 6/2012 | Bovo | H04L 43/18 370/331 |
| 2014/0376390 | A1 * | 12/2014 | Kreher | H04W 24/08 370/252 |
| 2016/0057634 | A1 * | 2/2016 | Sugahara | H04W 24/02 370/252 |
| 2017/0150365 | A1 * | 5/2017 | Goswami | H04W 16/04 |

* cited by examiner

*Primary Examiner* — Sharad Rampuria
(74) *Attorney, Agent, or Firm* — Knobbe, Martens, Olson & Bear, LLP

(57) ABSTRACT

A cell coverage management service associated with a wireless communication service provider may collect geolocated traffic data related to coverage areas of the provider's wireless communication network. The service may generate and update associations between geolocations and cells based on the traffic data and determine defects or deficiencies in the current coverage among cells. The service may further identify particular remedies or solutions to address the defects or deficiencies and implement the remedies at corresponding cell sites.

20 Claims, 4 Drawing Sheets

COVERAGE MANAGEMENT FOR WIRELESS COMMUNICATION NETWORK

BACKGROUND

Generally described, computing devices and communication networks facilitate the collection and exchange of information. Utilizing a wireless communication network and relevant communication protocols, a computing device can engage in communications with a wide variety of computing devices. In accordance with a telecommunication environment, telecommunication devices, such as mobile terminals, establish connections with various computing devices via a wireless communication network provided by a wireless communication service provider.

Wireless communication networks are comprised of infrastructure equipment often referred to as base stations or cell sites that transmit and receive radio signals with mobile devices or other wireless capable devices. A service provider can locate infrastructure equipment geographically within a larger area such that the range of wireless communications may have some overlap and may resemble a pattern such as a set of overlapping cells. The geographic area for which individual infrastructure equipment can receive and transmit radio communications to various mobile device is known as the coverage of the individual infrastructure equipment, and the quantity of devices or the data throughput that the individual infrastructure equipment can support within its geographic area may be considered the capacity of the individual infrastructure equipment. Within a defined range of individual infrastructure equipment, mobile devices may experience a different quality of radio signal communications according to the amount of power used for radio transmissions by the individual infrastructure equipment, the orientation and capabilities of antennas, the terrain, buildings, interfering signals from other infrastructure equipment or other device, and various features that affect radio wave propagation. To deliver service across a large geographic region, wireless communication service providers may maintain networks of cells with overlapping coverages and capacities.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Figure 1:
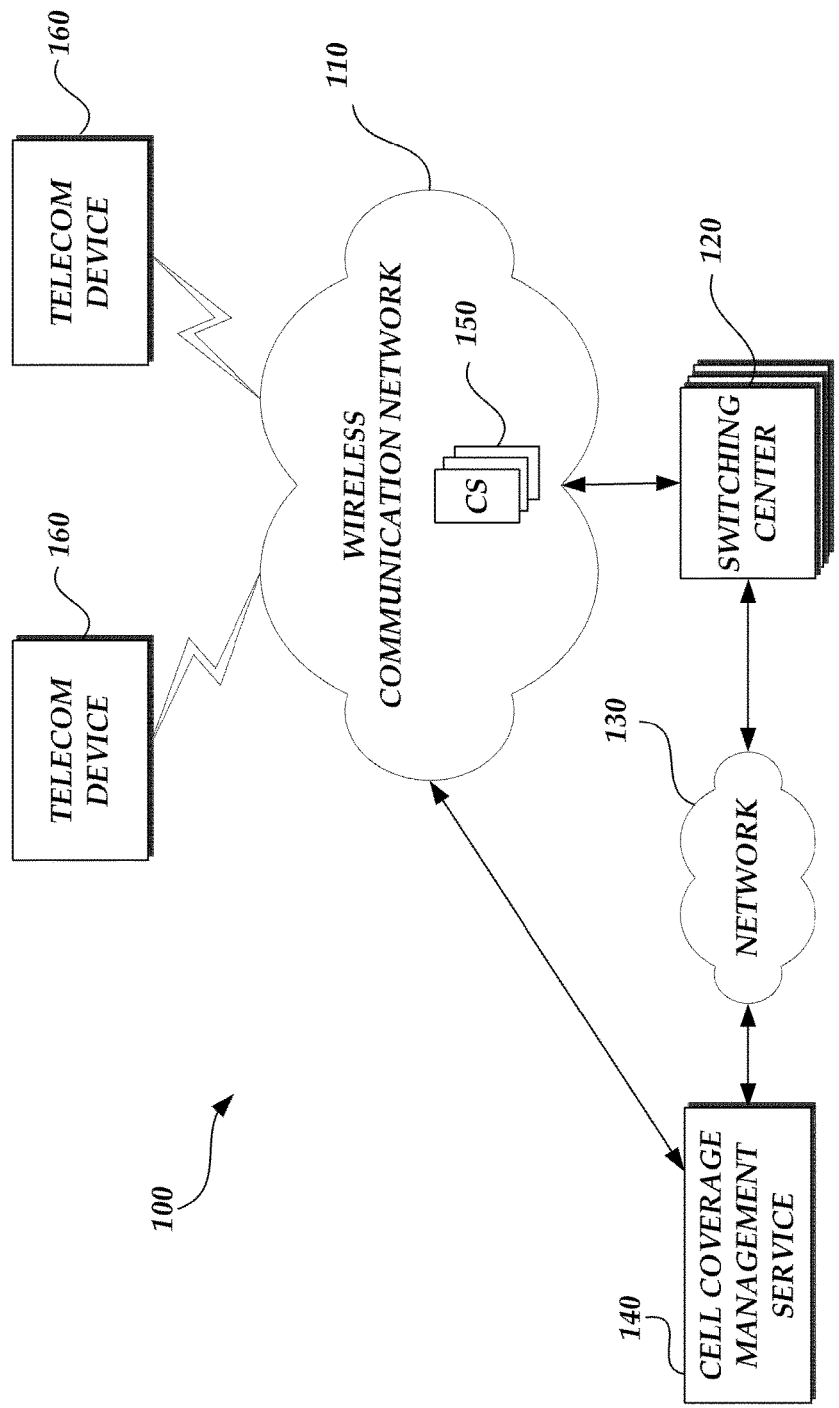
FIG. 1 is a block diagram depicting an illustrative telecommunication environment.

Generally described, aspects of the present disclosure are directed to the management of radio communications coverage in a wireless communication network. More specifically, in an illustrative embodiment, aspects of the present disclosure relate to systems and methods for deteiinining radio communications coverage defects in a wireless communication network based on geolocated traffic data of the wireless communication network. Generally described, geolocated traffic data can include information regarding one or more aspects of data traffic associated with one or more identifiable geographic locations. Examples of data traffic information can include wireless signal information associated with individual infrastructure equipment that serve or otherwise affect the geographic location. In other aspects, the present disclosure can relate to determining and implementing mitigation techniques or corrective measures in response to identified radio communication coverage defects.

In accordance with an illustrated embodiment, a cell coverage management service associated with a wireless communication service provider collects geolocated traffic data associated with one or more geographic coverage areas served by infrastructure equipment of the provider's wireless communication network. In one aspect, traffic data includes information regarding traffic at particular geographic locations (e.g., latitude-longitude coordinates). In another aspect, the traffic data may include cell site information or wireless signal infoi nation (e.g., strength, quality, or signal noise ratio) associated with one or more cells that serve or otherwise affect a geographic location. In yet another aspect, the geolocated traffic data may include information collected measured performance (e.g., wireless signal and communication measurements collected by specialized car-mount or mobile equipment at various locations), records (or metadata) of phone calls made from a telecommunication device at particular locations, or records (or metadata) that a telecommunication device downloaded a quantity of data while utilizing the wireless communication network at a particular location.

In some embodiments, the geolocated traffic data may be collected from the telecommunication devices or otherwise from the service provider's wireless communication network. In other embodiments, the geolocated traffic data may be collected from, e.g., social media networks, customer care systems, or other sources. In some embodiments, the geolocated traffic data may include timestamps or other information regarding the communication traffic. The cell coverage management service may further collect data regarding the wireless communication network. Such data may include, for example, locations of cell sites of the wireless communication network, orientation and capabilities of cell site antennas, intended or designed cell coverage, cell site capacities, subscriber and business locations, or the like.

To achieve improved perfoiniance of the wireless communication network (e.g., well defined cell coverage boundaries for optimal cell coverage and capacity, reduction of "boomer" cells for optimal inter-cell interference, or the like), the cell coverage management service may seek to identify defects or deficiencies in the current coverage among various cells using the collected geolocated traffic data. The service may further seek to evaluate these defects and to identify particular remedies or solutions that address particular needs of one or more cells or locations. In accordance with the present disclosure, the cell coverage management service may do so by automatically processing and analyzing the geolocated traffic data in conjunction with infoiniation of various cell sites.

Illustratively, the cell coverage management service may process and analyze the geolocated traffic data to identify various defects or deficiencies in the current coverage of cells. For example, for a defined period of time (e.g., most recent 24 hours), the cell coverage management service may calculate the distance and orientation from various locations associated with data points included in the traffic data to one or more cell sites that serve or otherwise affect the location. With this information, the cell coverage management service may create or update a cell-to-geolocation database which includes data entries of associations between different geolocations and different cell sites. The associations may be one-to-one, one-to-multiple, multiple-to-one, or multiple-to-multiple between geolocations and cell sites.

The cell coverage management service may analyze the cell-to-geolocation data to identify serving cell and interfering cell(s) for various geolocations. Based on the range, quantity, density or other characteristics of geolocations that are served or interfered by specific cell sites, the cell coverage management service may utilize standardized rules to automatically determine defects in terms of cell boundary, inter-cell interference, cell coverage, or the like. Depending on the determined defects, the cell coverage management service may identify corresponding remedies. Illustratively, such remedies may include changing the orientation of antennas at cell site(s) that likely caused the defect. In some embodiments, technicians may carry out the remedies manually. In other embodiments, actions corresponding to the remedies may be automatically performed by networked antenna controlling systems of devices.

Although described with reference to a wireless communication service provider operating a wireless communications network, elements of the present disclosure are not limited to the embodiment so illustrated. For example, the systems, methods and functionalities disclosed herein may be used to analyze a third party's wireless communication network, propose changes to a network, a proposed network, or the rollout of an air interface standard, network feature, or other new technology. Further, although described herein with reference to cell coverage, other aspects of a wireless communication network may be analyzed and evaluated. For example, the cell coverage management service may analyze cost, latency, or other factors when processing the geolocated traffic data. Still further, embodiments of the present disclosure may be applied to identifying and recommending a variety of solutions or combinations of solutions in overlay networks, Wi-Fi networks, third-party wireless networks, and the like.

The foregoing aspects and many of the attendant advantages will become more readily appreciated as the same become better understood by reference to the following description of illustrative embodiments, when taken in conjunction with the accompanying drawings depicting the illustrative embodiments.

With reference now to FIG. 1, a block diagram illustrative of a telecommunication environment 100 will be described. The telecommunication environment 100 can include a cell coverage management service 140. In an illustrative embodiment, the cell coverage management service 140 may be utilized to process and analyze geolocated traffic data, determine cell coverage defects or deficiencies, identify and implement corresponding remedies to improve performance of a wireless communication network 110.

While the cell coverage management service 140 is depicted in FIG. 1 as corresponding to a single computing device in the telecommunication communication environment 100, this is illustrative only. The cell coverage management service 140 may be embodied in a plurality of computing devices, each implementing some functionality of the cell coverage management service. The computing device (e.g., a server) may include memory, processing unit(s), and computer readable medium drive(s), all of which may communicate with one another by way of a communication bus. The computing device may include network interface(s) that provide connectivity over the wireless communication network 110, a network 130 and/or other networks or computer systems. The processing unit(s) may communicate to and from memory containing program instructions that the processing unit(s) executes in order to operate the cell coverage management service 140. The memory generally includes RAM, ROM, and/or other persistent and auxiliary memory.

With continued reference to FIG. 1, the telecommunication environment 100 can include a number of telecommunication devices 160, each associated with a user. The telecommunication devices 160 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP")), cordless telephones, cellular telephones, smart phones, modems, personal digital assistants, laptop computers, gaming devices, media devices, and the like. In an illustrative embodiment, the telecommunication devices 160 include a wide variety of software and hardware components for establishing communications over one or more communication networks, including the wireless communication network 110, a wired communication network (not shown), or an IP-based telecommunication network (not shown).

Although the wireless communication network 110 is illustrated as a single communication network, one skilled in the relevant art will appreciate that the communication network can be made up of any number of public or private communication networks and/or network connections. The wireless communication network 110 can include a network of cell sites 150 located in different geographic locations, each having an intended or designed coverage area.

A telecommunication device 160 within the coverage area of a cell site can connect to infrastructure equipment of the cell site and communicate over the wireless communication network 110 in accordance with any one of a number of wireless telecommunication interfaces. As mentioned above, the telecommunication device 160 may generate geolocated traffic data when communicating via the wireless communication network 110. Illustratively, the telecommunication device 160 may be equipped with GPS or other geolocation tracking functionality, which may correlate geolocation of the device (e.g., latitude-longitude coordinates) with communications via the wireless communication network 110, such as during an attempt to establish a communication channel, a voice call or data session, a handover of communication between cells, or the like.

In an illustrative embodiment, the telecommunication communication environment 100 can include a number of additional components, systems and/or subsystems for facilitating communications with the telecommunication devices 160, and the cell coverage management service 140. The additional components can include one or more switching centers 120 for establishing communications with the telecommunication devices 160 via the wireless communication network 110, such as a cellular radio access network incorporating one or more wireless air interface standards promulgated by a standards organization, such as air interface protocols based on code division multiplex access (CDMA), time division multiple access (UEMA), global system for mobile communications (GSM), wireband code division multiplex access (WCDMA), code division multiplex access $3^{rd}$ generation (CDMA2000), time division synchronous code division multiple access (UE-SCDMA), wavelength and time division multiple access (WUEMA), long term evolution (LTE), orthogonal frequency division multiple access (OFDMA), IEEE 802.11 technical standards ("WiFi"), IEEE 802.16 standards ("WiMax"), Unlicensed Mobile Access ("UMA"), General Access Network ("GAN"), or other technologies. The operation of mobile communication networks, such as wireless communication network 110 are well known and will not be described in greater detail. As illustrated in FIG. 1, the switching center 120 also includes interfaces for establishing various communications via the communication network 130, such as the Internet, intranets, private networks and point to point networks, generally referred to as the "network."

In the illustrated embodiment, the telecommunication devices 160 and the cell coverage management service 140 may communicate via the network 130 (or the wireless communication network 110) using existing communications protocols such as the Hypertext Transfer Protocol (HTTP), specialized communications protocols, application programming interfaces (APIs), or any other communications protocol.

Figure 2:
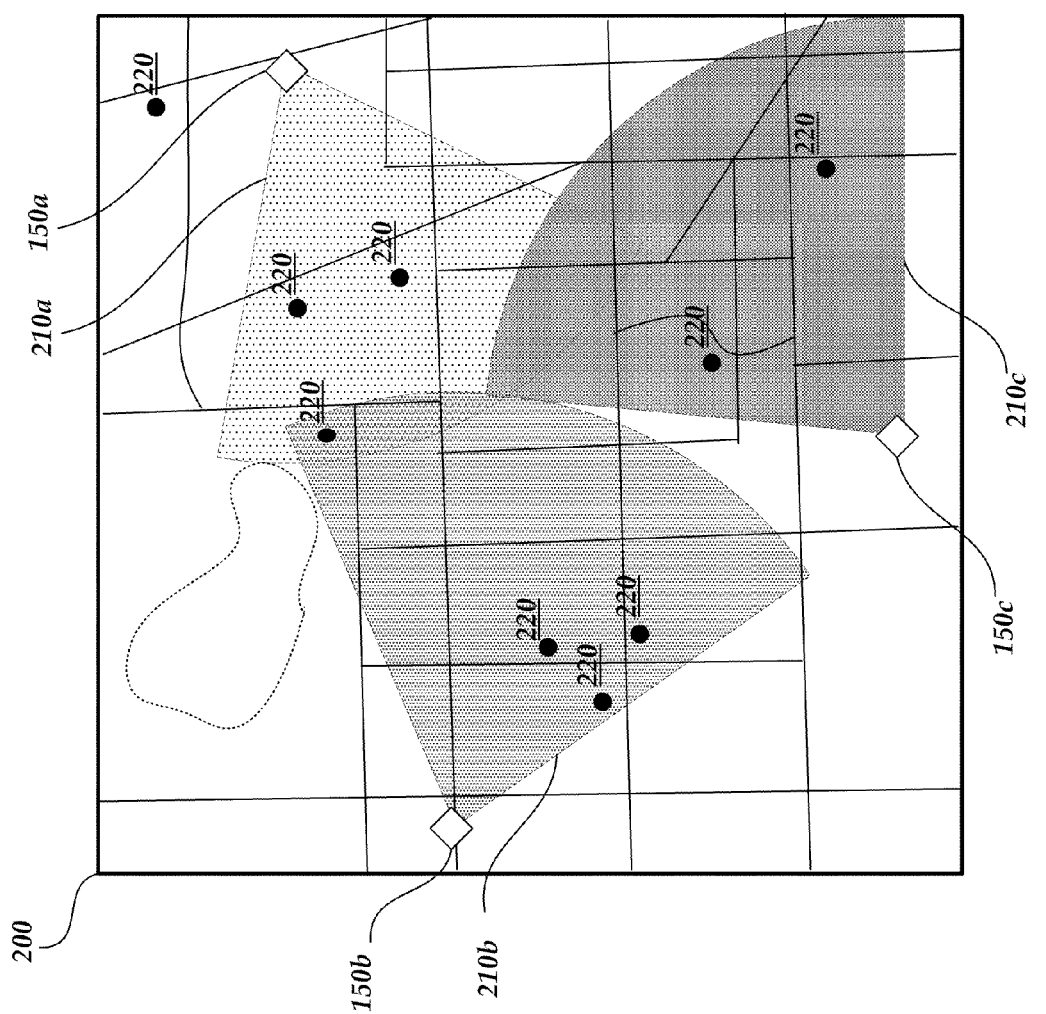
FIG. 2 is an illustrative diagram depicting geolocated telecommunication traffic in relation to cell sites in the illustrative telecommunication environment of FIG. 1.

FIG. 2 is an illustrative diagram 200 depicting geolocated telecommunication traffic in relation to cell sites in the illustrative telecommunication environment 100 of FIG. 1. The diagram 200 illustrates cell sites 150 and a plurality of specific geographic locations, generally referred to as telecommunication traffic data points 220 overlaid on at least a partial map of streets and city blocks. As will be explained in greater detail, individual telecommunication traffic data points 220 will be utilized as a basis to establish associations between various geographic locations and the coverage areas (or cells) served by individual infrastructure equipment (e.g., e-node B's, cell stations, base stations, and the like). As previously discussed, cell sites 150a, 150b, and 150c can be associated with their respective coverage areas 210a, 210b, and 210c. Illustratively, the coverage areas 210 represent anticipated or actual radio transmission coverage areas based on the placement of corresponding cell site infrastructure equipment within the wireless communication network 110. The coverage areas 210a, 210b, 210c may be modeled based on actual parameters of the individual infrastructure equipment or measured performance thereof. Alternatively, one or more aspects of the coverage areas 210a, 210b, 210c may be approximated or utilize generic parameters/performance. As illustrated in FIG. 2, cell coverage areas 210a, 210b, and 210c overlap with one another in some portions. In some embodiments, certain individual infrastructure equipment may be associated with multiple coverage areas (e.g., multiple cells) that are oriented differently and implement same or different network standards or technologies.

Telecommunication traffic data points 220 may correspond to a snapshot of a telecommunication device 160 communicating or attempting to communicate via the wireless communication network 110 at a specific time or during a specific period of time. Each data point 220 can include geographic location and can be projected onto the diagram 200 based on geographic location information (e.g., latitude-longitude coordinates, street address, etc.) of the data point. As can be seen in FIG. 2, data points 220 may be located outside any cell coverage area, within an area with overlapping coverage from multiple cells, or within a single cell coverage area. As previously discussed, each data point 220 may include cell site information or wireless signal information (e.g., strength, quality, or signal noise ratio) associated with one or more cells that serve or otherwise affect the geographic location of the data point.

Figure 3:
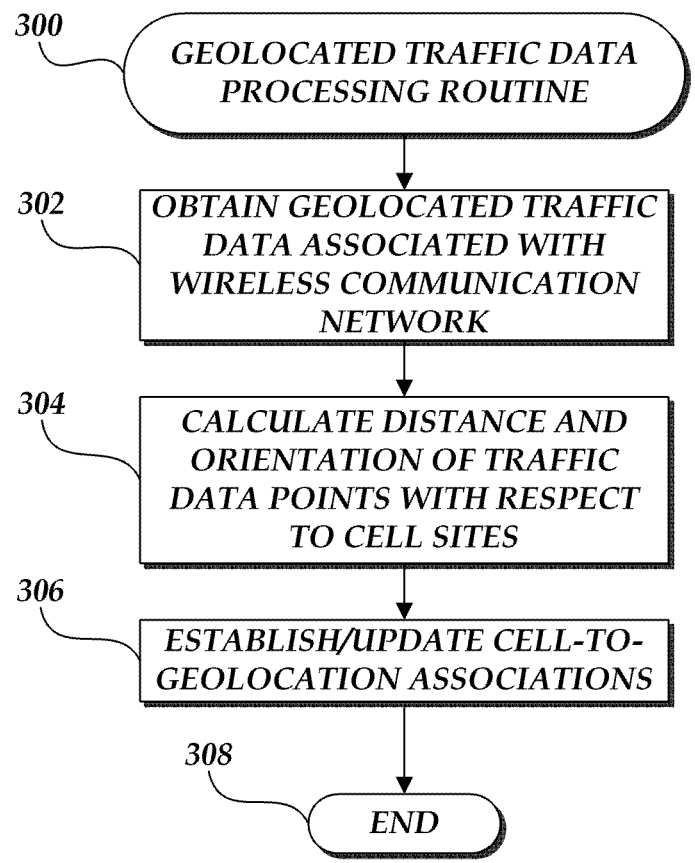
FIG. 3 is a flow diagram depicting an illustrative routine for processing geolocated traffic data.

FIG. 3 is a flow diagram depicting an illustrative routine 300 for processing geolocated traffic data. Illustratively, the routine 300 may be performed by the cell coverage management service 140. The routine 300 can be used to process and analyze geolocated traffic data and generate a database or data set of associations between cells and geolocations.

At block 302, the cell coverage management service 140 obtains geolocated traffic data associated with the wireless communication network 110. As discussed above, data points included in the traffic data is geolocated in that it contains information regarding traffic at particular locations (e.g., latitude-longitude coordinates, street address, etc.). The traffic data may include cell site information or wireless signal information (e.g., strength, quality, or signal noise ratio) associated with one or more cells that serve or otherwise affect a geographic location. Illustratively, the geolocated traffic data may include drive test data (e.g., wireless signal and communication measurements collected by specialized car-mount or mobile equipment at various locations), records (or metadata) of phone calls made from a telecommunication device at particular locations, or records (or metadata) that a telecommunication device downloaded a quantity of data while utilizing the wireless communication network at a particular location.

Geolocated traffic data may also include one or more indications of the type of traffic corresponding to the same location. Indications of traffic may include, for example, usage data from the wireless communications network, activity on social media, "check-ins" at businesses or points of interest, user-generated usage reports, tickets from a customer care system, upload or download speeds, subscriber activations or cancellations, or any other data representing actual or potential usage of wireless telecommunications services at the specified location. The geolocated traffic data may further include date and time information, user demographics, device characteristics, information about the location (e.g., altitude above sea level, proximity to a local business or point of interest, etc.), or any other information relevant to determining cell coverage.

The cell coverage management service 140 may obtain the traffic data at regular intervals (e.g., daily or hourly), and the obtained traffic data may be filtered to correspond to a specified period of time (e.g., the past 24 hours). In some embodiments, certain events (e.g., addition of new cell site(s), implementation of remedies aimed to cure cell coverage defects, or fluctuation of traffic that exceeds certain threshold) may trigger the cell coverage management service 140 to obtain geolocated traffic data. In some embodiments, the geolocated traffic data may be collected from telecommunication devices 160 that utilize or attempt to utilize the wireless communication network 110. In other embodiments, the geolocated traffic data may be collected from, e.g., social media networks, customer care systems, or other sources. In some embodiments, the geolocated traffic data may include timestamps or other information regarding the communication traffic.

At block 304, the cell coverage management service 140 calculates distance and orientation of telecommunication traffic data points 220 with respect to cell sites 150. As discussed above, telecommunication traffic data points 220 may correspond to one or more data points collected in the geolocated traffic data. In some embodiments, the cell coverage management service 140 may already have or may collect data regarding cell sites 150 of the wireless communication network 110. Such data may include, for example, the locations of cell sites 150 in the network, the orientation and capabilities of cell site antennas, the intended or designed cell coverage areas, cell site capacities, subscriber and business locations, or the like.

The cell coverage management service 140 may convert the location information associated with telecommunication traffic data points and cell sites into a standardized or otherwise comparable format (e.g., latitude-longitude coordinates, relative distance and orientation to a predefined landmark, etc.). The cell coverage management service 140 may then compare the locations of each traffic data point against each cell site and compute relative distance and orientation between the two. In some embodiments, the cell sites, traffic data points, and their relative distance and orientation may be overlaid on a map, such as the map of FIG. 2.

At block 306, the cell coverage management service 140 establishes or updates cell-to-geolocation associations. The cell coverage management service 140 may create or update a database or dataset that store these associations. The associations between geolocations and cell sites can include or can be based on the distance, orientation, signal strength, network usage, quality of service, or other measurements of different cells as determined from different geolocations. Illustratively, the associations can be stored in a matrix where each column represents a distinct cell site and each row represents a distinct geolocation. In some embodiments, certain rows of the matrix may represent a cluster or range of geolocations within a threshold proximity of one another. Each cell of the matrix may be filled or updated with specific cell-to-geolocation association values based on the recently obtained traffic data. Of course, other applicable data structures such as linked lists, queue, stack, or heap may be used to store the cell-to-geolocation association data as well. The routine of FIG. 3 ends at block 308.

Figure 4:
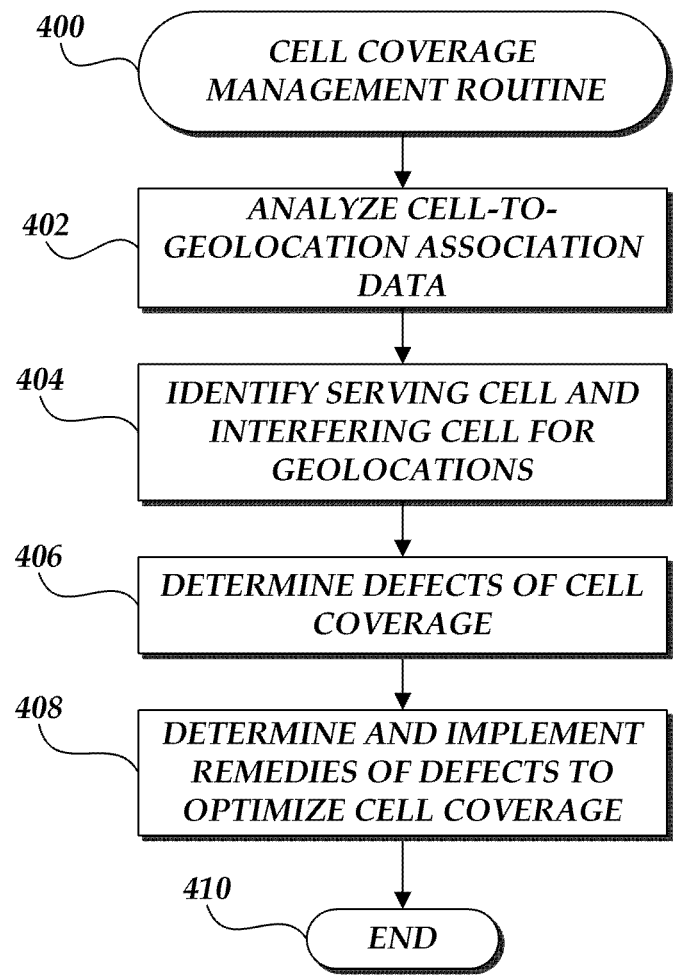
FIG. 4 is a flow diagram depicting an illustrative routine for managing cell coverage.

FIG. 4 is a flow diagram depicting an illustrative routine 400 for managing cell coverage. Illustratively, the routine 400 may be performed by the cell coverage management service 140. The routine 400 can be used to identify defects or deficiencies in the current coverage of one or more cells based on an analysis of cell-to-geolocation association data, and determine actions that are applicable to cell sites to remedy the identified defects or deficiencies.

At block 402, the cell coverage management service 140 obtains and analyzes cell-to-geolocation association data, such as the data generated by routine 300. Illustratively, the cell coverage management service 140 may analyze the data from a cell perspective. For example, the cell coverage management service 140 may identify all of the geolocations that bear relationship with a specified cell site. The cell coverage management service 140 may analyze the signal strength detected at these geolocations that corresponds to the specified cell. If the signal strength detected at a geolocation is above certain threshold, the geolocation may be considered within the coverage of the cell. In this way, a geographic contour of coverage area served or capable of being served by the specified cell can be determined. Such a determined coverage area may or may not coincide with the intended or designed coverage of the specified cell.

At block 404, the cell coverage management service 140 identifies serving cell(s) and interfering cell(s) for various geolocations. Illustratively, the cell coverage management service 140 may process the cell-to-geolocation data from a geolocation perspective. For example, the cell coverage management service 140 may identify all of the cells that bear relationship with a specified geolocation or a specified group of geolocations within a threshold proximity. The cell coverage management service 140 may analyze the signal strengths detected at the geolocation (or group of geolocations) that correspond to different cell. The cell coverage management service 140 may further rank or order the cells based on their respective signal strengths.

In some embodiments, the cell that has the strongest signal at the specified geolocation may be labeled as the serving cell for the geolocation and cell(s) having weaker signal(s) may be labeled as interfering cell(s). In some embodiments, thresholds on cell signal strength, distance, or orientation between cell site and geolocation, signal-to-noise ratio, or the like, may be utilized for the determination of serving or interfering cells.

At block 406, the cell coverage management service 140 may determine defects or deficiencies of cell coverage based on the data analysis. The defects or deficiencies may be determined based on a set of predetermined or dynamically generated rules, criteria, or thresholds. In some embodiments, the cell coverage management service 140 may identify cell boundary defects. Illustratively, the cell coverage management service 140 may compare the contour of cell coverage as determined at block 402 (hereinafter "measured coverage") against intended or designed coverage of a specified cell. The cell coverage management service 140 may determine if the area of the measured cell coverage is larger or smaller than an intended coverage of the cell by some threshold margin. For example, the cell coverage management service 140 may determine whether a threshold number or percentage of geolocations served by the specified cell are beyond the intended coverage area. As another example, the cell coverage management service 140 may determine whether the farthest geolocation served by the specified cell is inside the intended coverage area by a threshold distance.

In some embodiments, the cell coverage management service 140 may identify areas with high interference. Illustratively, the cell coverage management service 140 may identify geolocations with poor signal-to-interference ratio (i.e., the ratio of signal strengths between serving cell and interfering cell(s) falls below certain threshold.) In these cases, one or more interfering cells may be labeled as overshooter cells. In some embodiments, thresholds on the distance and orientation of the interfering cell(s) may also be used to further refine or filter out the identified overshooter cells.

In other embodiments, the cell coverage management service 140 may identify areas with poor coverage of wireless signal. Illustratively, the cell coverage management service 140 may identify geolocations with low signal strength (e.g., below a certain threshold) from serving, interfering, or otherwise non-serving cells. In other words, the geolocations may not have a dominant serving cell. Such geolocations or group of geolocations may be labeled as poor coverage areas.

At block 408, the cell coverage management service 140 determines and implements one or more remedies of the determined defects or deficiencies. In situations where the measured coverage is smaller than the intended coverage of a specified cell, the cell coverage service 140 may determine uptilting the antennas) at the specified cell site as a remedy. In situations where the measured coverage is larger than the intended coverage of a specified cell, the cell coverage service 140 may determine downtilting the antenna(s) at the specified cell site as a remedy. The angles for antenna uptilting or downtilting may be calculated based on predetermined rule(s) or formula(e) involving the difference in measured and intended coverage areas, as well as the location, terrain, and capacity of the corresponding cell site.

In situations where an area of high interference was identified, the cell coverage service 140 may determine downtilting the antenna(s) at overshooter cell(s) as a remedy. The angles for antenna downtilting may be calculated based on predetermined rule(s) or formula(e) involving the location, terrain, capacity, and signal strength of both the serving cell and overshooter cell(s). In situations where a poor coverage area was identified, the cell coverage service 140 may examine the distance, orientation, and signal strength of each cell that affects the poor coverage area and identify an intended serving cell. The cell coverage service 140 may then determine uptilting the antenna(s) at the intended serving cell as a remedy. The angles for antenna uptilting may be calculated based on predetermined rule(s) or formula(e) involving the location, terrain, capacity, and signal strength of the intended serving cell.

Because multiple cell coverage defects or deficiencies may be determined concurrently (or determined within a short period of time among one another) at block 406, remedies for the defects or deficiencies may involve inconsistent or contradictory actions at one or more cell sites. In these cases, the cell coverage management service 140 may prompt an engineer, operator, or administrator for prioritization or adjustment of certain remedies. In some embodiments, the remedy prioritization or adjustment may be automatically conducted based on predetermined remedy reconciliation rules.

In some embodiments, the cell coverage management service 140 may present remedies to engineers, operators, or administrators for manual implementation at one or more cell sites. In other embodiments, the cell coverage management service 140 may generate computer-executable instructions corresponding to the remedies, and transmit the instructions to controlling system(s) or device(s) of the one or more cell sites for implementation. The routine of FIG. 4 ends at block 410.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements andlor states are in any way required for one or more embodiments or that one or more embodiments necessarily include logic for deciding, with or without author input or prompting, whether these features, elements and/or states are included or are to be perfomied in any particular embodiment. The tei ns "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for managing geographic coverage of a plurality of cells associated with a wireless communication network, the method comprising:
   obtaining geolocated traffic data based, at least in part, on communications between one or more devices and a plurality of infrastructure equipment,
   wherein the plurality of infrastructure equipment is associated with a wireless communication network and a defined coverage area;
   generating location-to-coverage-area associations between individual locations within the defined coverage area and individual devices of the plurality of infrastructure equipment based, at least in part, on the geolocated traffic data;
   determining, based at least in part on an analysis of the location-to-coverage-area associations, a geographic region associated with a coverage defect;
   in response to determining the geographic region associated with the coverage defect, identifying a corrective action to take defined, at least in part, on the geographic region and
   a predetermined rule applicable to the coverage defect, the corrective action comprising at least one of uptilting or downtilting one or more antennas associated with one or more devices of the plurality of infrastructure equipment; and
   causing the one or more devices of the plurality of infrastructure equipment to implement the identified corrective action.

2. The computer-implemented method of claim 1, wherein the geolocated traffic data includes latitude-longitude information associated with the individual locations within the defined coverage area.

3. The computer-implemented method of claim 1, wherein the geolocated traffic data includes temporal information associated with the communications via the wireless communication network.

4. The computer-implemented method of claim 1, wherein generating location-to-coverage-area associations comprises determining relative distance and orientation between the individual locations within the defined coverage area and the individual devices of the plurality of infrastructure equipment.

5. The computer-implemented method of claim 1, wherein the geolocated traffic data includes signal strength corresponding to one or more cells detected at respective locations.

6. The computer-implemented method of claim 5, wherein generating location-to-coverage-area associations comprises determining whether the signal strength corresponding to the one or more cells exceeds a threshold.

7. The computer-implemented method of claim 1, wherein determining the geographic region associated with the coverage defect comprises determining a serving coverage area and one or more interfering coverage areas for one or more locations.

8. The computer-implemented method of claim 7, wherein determining a serving coverage area and one or more interfering coverage areas for one or more locations comprises ranking signal strengths of cells detected at the one or more locations.

9. The computer-implemented method of claim 7, wherein determining the geographic region associated with the coverage defect comprises determining whether the one or more locations correspond to an area of high interference based, at least in part, on a ratio of signals between the serving coverage area and the one or more interfering coverage areas.

10. A non-transitory computer-readable medium storing computer-executable instructions that, when executed by a processor, cause the processor to perform operations comprising:
    generating location-to-coverage-area associations between individual locations and individual devices within a plurality of infrastructure equipment,
    wherein the plurality of infrastructure equipment is associated with a wireless communication network, and wherein generating location-to-coverage-area associations is based, at least in part, on geolocated traffic data;
    identifying, based at least in part on an analysis of the location-to-coverage-area associations, a geographic region associated with one or more coverage attributes,
    wherein the geographic region is associated with at least one device within the plurality of infrastructure equipment; and
    in response to identifying the geographic region, implementing one or more actions that modify the one or more coverage attributes of the at least one device within the plurality of infrastructure equipment,
    wherein implementing the one or more actions comprises at least one of uptilting or downtilting one or more antennas associated with the at least one device within the plurality of infrastructure equipment.

11. The non-transitory computer-readable medium of claim 10, wherein the operations further comprise obtaining the geolocated traffic data from one or more telecommunication devices that communicate via the wireless communication network.

12. The non-transitory computer-readable medium of claim 11, wherein the geolocated traffic data includes a temporal snapshot of the one or more telecommunication devices communicating via the wireless communication network within a coverage area of one of the plurality of infrastructure equipment.

13. The non-transitory computer-readable medium of claim 10, wherein each of the plurality of infrastructure equipment has an intended coverage area.

14. The non-transitory computer-readable medium of claim 13, wherein the operations further comprise determining a measured coverage area for each of the plurality of infrastructure equipment based, at least in part, on the geolocated traffic data.

15. The non-transitory computer-readable medium of claim 14, wherein identifying the geographic region comprises determining a discrepancy between the measured coverage area of the at least one device and the intended coverage area of the at least one device.

16. A system comprising a computing device in communication with one or more switching centers associated with a wireless communication network, the computing device configured to:
- generate associations between individual locations within a plurality of locations and coverage areas associated with individual devices within a plurality of infrastructure equipment located in a wireless communication network,
- wherein the associations are generated based, at least in part, on geolocated traffic data;
- identify, based at least in part on an analysis of the associations between the individual locations within the plurality of locations and the coverage areas associated with individual devices within the plurality of infrastructure equipment, a geographic region associated with two or more coverage attributes, wherein the geographic region is associated with at least one device within the plurality of infrastructure equipment; and
- in response to identification of the geographic region, cause implementation of one or more actions to modify the two or more coverage attributes on the at least one device,
- wherein the one or more actions comprise at least one of uptilting or downtilting one or more antennas associated with the at least one device.

17. The system of claim 16, wherein the computing device is further configured to identify the geographic region within a threshold period of time.

18. The system of claim 16, wherein the computing device is further configured to:
- identify candidate actions based, at least in part, on each of the two or more coverage attributes; and
- determine inconsistencies among the candidate actions.

19. The system of claim 18, wherein the implementation of the one or more actions comprises at least one of prioritization or adjustment of the candidate actions.

20. The computer-implemented method of claim 1, wherein the coverage defect comprises one or more of a discrepancy between intended coverage and measured coverage, a high interference area, or a poor coverage area.

* * * * *